(12) United States Patent
Venkataraman et al.

(10) Patent No.: US 9,642,056 B2
(45) Date of Patent: May 2, 2017

(54) COMPUTER IMPLEMENTED SYSTEM AND METHOD FOR OFFLOADING TRAFFIC

(71) Applicant: Tech Mahindra Limited, Maharashtra (IN)

(72) Inventors: Hrishikesh Venkataraman, Pune (IN); Prashant Bauskar, Pune (IN); Avinash Joshi, Pune (IN)

(73) Assignee: Tech Mahindra Limited, Pune (IN)

(*) Notice: Subject to any disclaimer, the term of this patent is extended or adjusted under 35 U.S.C. 154(b) by 72 days.

(21) Appl. No.: 14/660,465

(22) Filed: Mar. 17, 2015

(65) Prior Publication Data
US 2015/0282027 A1    Oct. 1, 2015

(30) Foreign Application Priority Data

Mar. 28, 2014 (IN) .......................... 1113/MUM/2014

(51) Int. Cl.
*H04W 36/22* (2009.01)
*H04W 28/02* (2009.01)
(Continued)

(52) U.S. Cl.
CPC ....... *H04W 36/14* (2013.01); *H04W 28/0247* (2013.01); *H04W 28/08* (2013.01);
(Continued)

(58) Field of Classification Search
CPC ..... H04W 8/082; H04W 12/06; H04W 16/08; H04W 16/14; H04W 16/32; H04W 24/02; H04W 28/0226; H04W 28/0247; H04W 28/0289; H04W 28/0284; H04W 28/08; H04W 28/085; H04W 28/24; H04W 36/0066; H04W 36/0083; H04W 36/14; H04W 36/22; H04W 36/245; H04W 36/30; H04W 40/246; H04W 48/16; H04W 48/18; H04W 48/20; H04W 64/00; H04W 72/10;
(Continued)

(56) References Cited

U.S. PATENT DOCUMENTS

| | | | |
|---|---|---|---|
| 6,574,474 B1* | 6/2003 | Nielsen ................. | H04W 48/20 455/433 |
| 8,102,863 B1* | 1/2012 | Evans ..................... | H04L 63/10 370/230.1 |

(Continued)

FOREIGN PATENT DOCUMENTS

WO    2013/043869 A1    3/2013

*Primary Examiner* — Michael Thier
*Assistant Examiner* — Eric Nowlin
(74) *Attorney, Agent, or Firm* — Sheppard Mullin Richter & Hampton LLP

(57) ABSTRACT

The embodiment of the present invention provides a computer implemented network centric system and method for real-time traffic offloading belonging to a plurality of subscribers from a cellular network to a Wi-Fi network. When the cellular network utilization is greater than certain threshold and if there is capacity available in the Wi-Fi network, then the present invention classifies the subscribers based on subscriber and network parameters and offloads them to the Wi-Fi network using adaptive dichotomic methodology. The proposed invention also analyzes any external interrupts with the pre-determined trigger rules and accords them highest priority for offload.

10 Claims, 5 Drawing Sheets

(51) Int. Cl.
*H04W 28/24* (2009.01)
*H04W 36/14* (2009.01)
*H04W 28/08* (2009.01)

(52) U.S. Cl.
CPC ........ *H04W 28/0284* (2013.01); *H04W 28/24* (2013.01); *H04W 36/22* (2013.01)

(58) Field of Classification Search
CPC ........... H04W 72/1215; H04W 74/085; H04W 76/021; H04W 76/025; H04W 76/026; H04W 84/042; H04W 84/12; H04W 84/18; H04W 88/06; H04W 88/08; H04L 12/5695; H04L 47/122
See application file for complete search history.

(56) References Cited

U.S. PATENT DOCUMENTS

| | | | | |
|---|---|---|---|---|
| 8,824,433 B2 * | 9/2014 | Chen | H04W 28/08 | 370/227 |
| 8,867,490 B1 * | 10/2014 | Krishna | H04W 36/0011 | 370/310 |
| 9,094,864 B2 * | 7/2015 | Payyappilly | H04L 12/4633 | |
| 9,107,146 B2 * | 8/2015 | Chow | H04W 48/08 | |
| 9,203,563 B2 * | 12/2015 | Etemad | H04W 28/08 | |
| 9,392,522 B2 * | 7/2016 | Stojanovski | H04L 45/22 | |
| 9,474,018 B2 * | 10/2016 | Akhtar | H04W 48/18 | |
| 9,510,133 B2 * | 11/2016 | Gupta | H04W 28/0215 | |
| 9,516,546 B2 * | 12/2016 | Watfa | H04W 8/082 | |
| 9,538,418 B2 * | 1/2017 | Sirotkin | H04W 28/08 | |
| 9,538,441 B2 * | 1/2017 | Meredith | H04W 36/14 | |
| 2004/0229621 A1 * | 11/2004 | Misra | H04W 16/08 | 455/445 |
| 2006/0209686 A1 * | 9/2006 | Wigard | H04L 1/1887 | 370/229 |
| 2007/0248033 A1 * | 10/2007 | Bejerano | H04W 16/08 | 370/318 |
| 2011/0252477 A1 * | 10/2011 | Sridhar | H04L 12/14 | 726/24 |
| 2011/0320588 A1 * | 12/2011 | Raleigh | H04W 36/245 | 709/224 |
| 2012/0113965 A1 * | 5/2012 | Puthenpura | H04W 28/08 | 370/338 |
| 2012/0135737 A1 * | 5/2012 | Yoshihara | H04W 36/30 | 455/436 |
| 2012/0230191 A1 * | 9/2012 | Fang | H04W 36/22 | 370/235 |
| 2012/0282979 A1 * | 11/2012 | Ashraf | H04W 16/08 | 455/561 |
| 2012/0297055 A9 | 11/2012 | Raleigh | | |
| 2013/0070594 A1 * | 3/2013 | Garcia Martin | H04W 28/08 | 370/235 |
| 2013/0077482 A1 * | 3/2013 | Krishna | H04W 36/22 | 370/230 |
| 2013/0183935 A1 * | 7/2013 | Holostov | H04W 12/06 | 455/411 |
| 2013/0242783 A1 * | 9/2013 | Horn | H04W 24/10 | 370/252 |
| 2013/0265879 A1 * | 10/2013 | Qiang | H04W 48/18 | 370/235 |
| 2013/0286826 A1 * | 10/2013 | Park | H04W 28/08 | 370/230 |
| 2013/0322238 A1 * | 12/2013 | Sirotkin | H04W 28/0247 | 370/230 |
| 2014/0010207 A1 * | 1/2014 | Horn | H04W 36/165 | 370/332 |
| 2014/0023041 A1 * | 1/2014 | Zhao | H04W 36/14 | 370/331 |
| 2014/0040504 A1 * | 2/2014 | Gupta | H04W 24/04 | 709/244 |
| 2014/0064068 A1 * | 3/2014 | Horn | H04W 28/0289 | 370/230 |
| 2014/0082697 A1 * | 3/2014 | Watfa | H04W 76/025 | 726/3 |
| 2014/0204746 A1 * | 7/2014 | Sun | H04W 28/0247 | 370/235 |
| 2014/0204834 A1 * | 7/2014 | Singh | H04W 40/22 | 370/315 |
| 2014/0286159 A1 * | 9/2014 | Etemad | H04W 36/14 | 370/230 |
| 2014/0287743 A1 * | 9/2014 | Yeh | H04W 28/16 | 455/426.1 |
| 2014/0315536 A1 * | 10/2014 | Chow | H04W 8/18 | 455/419 |
| 2014/0328182 A1 * | 11/2014 | Gao | H04W 28/08 | 370/236 |
| 2014/0334446 A1 * | 11/2014 | Lim | H04W 48/20 | 370/331 |
| 2014/0341038 A1 * | 11/2014 | Lim | H04W 28/08 | 370/235 |
| 2014/0378131 A1 * | 12/2014 | Rui | H04W 76/022 | 455/433 |
| 2015/0003253 A1 * | 1/2015 | Wolfner | H04W 28/08 | 370/237 |
| 2015/0023341 A1 * | 1/2015 | Zhao | H04W 48/18 | 370/338 |
| 2015/0029879 A1 * | 1/2015 | Chou | H04W 76/02 | 370/252 |
| 2015/0043447 A1 * | 2/2015 | Stojanovski | H04L 5/0058 | 370/329 |
| 2015/0085659 A1 * | 3/2015 | Hong | H04W 76/023 | 370/235 |
| 2015/0092553 A1 * | 4/2015 | Sirotkin | H04W 48/16 | 370/235 |
| 2015/0109940 A1 * | 4/2015 | Okhravi | H04L 43/0888 | 370/252 |
| 2015/0139184 A1 * | 5/2015 | Wang | H04W 28/08 | 370/331 |
| 2015/0181491 A1 * | 6/2015 | Van Phan | H04W 28/08 | 370/331 |
| 2015/0195743 A1 * | 7/2015 | Sirotkin | H04W 28/08 | 370/235 |
| 2015/0215839 A1 * | 7/2015 | Johansson | H04W 36/30 | 455/426.1 |
| 2015/0257077 A1 * | 9/2015 | Sharony | H04W 36/14 | 455/440 |
| 2015/0282027 A1 * | 10/2015 | Venkataraman | H04W 36/14 | 370/329 |
| 2015/0296440 A1 * | 10/2015 | Forssell | H04W 48/08 | 370/329 |
| 2015/0304898 A1 * | 10/2015 | Faccin | H04W 28/0289 | 370/235 |
| 2015/0312808 A1 * | 10/2015 | Kiss | H04M 15/8038 | 370/331 |
| 2015/0312829 A1 * | 10/2015 | Hu | H04W 28/16 | 370/230 |
| 2015/0312831 A1 * | 10/2015 | Sang | H04W 36/0083 | 370/236 |
| 2015/0319091 A1 * | 11/2015 | Arora | H04L 12/403 | 370/235 |
| 2015/0327110 A1 * | 11/2015 | Jeong | H04W 48/20 | 370/338 |
| 2015/0327117 A1 * | 11/2015 | Sirotkin | H04W 28/08 | 370/235 |
| 2015/0334644 A1 * | 11/2015 | Kim | H04W 48/18 | 370/329 |
| 2015/0341821 A1 * | 11/2015 | Hong | H04W 28/08 | 370/230 |
| 2015/0350952 A1 * | 12/2015 | Ozturk | H04W 28/085 | 370/329 |
| 2015/0350953 A1 * | 12/2015 | Himayat | H04W 40/02 | 370/235 |
| 2015/0350988 A1 * | 12/2015 | Himayat | H04W 36/22 | 370/331 |
| 2015/0358889 A1 * | 12/2015 | Arora | H04W 40/04 | 370/338 |
| 2016/0029249 A1 * | 1/2016 | Chou | H04L 5/0085 | 370/338 |

(56) References Cited

U.S. PATENT DOCUMENTS

| | | | |
|---|---|---|---|
| 2016/0044590 A1* | 2/2016 | Joung | H04W 48/18 |
| | | | 370/230 |
| 2016/0050587 A1* | 2/2016 | Lam | H04W 28/08 |
| | | | 370/235 |
| 2016/0080998 A1* | 3/2016 | Fukuta | H04W 48/20 |
| | | | 370/331 |
| 2016/0088510 A1* | 3/2016 | Berggren | H04W 28/0226 |
| | | | 370/230 |
| 2016/0095037 A1* | 3/2016 | Morita | H04W 12/06 |
| | | | 370/331 |
| 2016/0112921 A1* | 4/2016 | Nagasaka | H04W 36/22 |
| | | | 370/331 |
| 2016/0127967 A1* | 5/2016 | Liu | H04W 28/08 |
| | | | 455/438 |
| 2016/0157154 A1* | 6/2016 | Nagasaka | H04W 36/14 |
| | | | 370/331 |
| 2016/0173297 A1* | 6/2016 | Kanugovi | H04L 12/4633 |
| | | | 370/328 |
| 2016/0182313 A1* | 6/2016 | Chen | H04L 41/5009 |
| | | | 455/436 |
| 2016/0183281 A1* | 6/2016 | Yeh | H04W 28/24 |
| | | | 370/332 |
| 2016/0192239 A1* | 6/2016 | Salvador | H04W 36/06 |
| | | | 370/331 |
| 2016/0192293 A1* | 6/2016 | Dai | H04W 52/0216 |
| | | | 370/238 |
| 2016/0205593 A1* | 7/2016 | Kauppinen | H04W 28/08 |
| | | | 370/235 |
| 2016/0295460 A1* | 10/2016 | Yuk | H04W 56/00 |
| 2016/0309384 A1* | 10/2016 | Zhang | H04W 12/06 |
| 2016/0316392 A1* | 10/2016 | Pantelidou | H04W 48/02 |
| 2016/0380820 A1* | 12/2016 | Horvitz | G06N 5/04 |
| | | | 370/254 |
| 2017/0006498 A1* | 1/2017 | Matas Sanz | H04W 28/08 |

* cited by examiner

COMPUTER IMPLEMENTED SYSTEM AND METHOD FOR OFFLOADING TRAFFIC

CROSS-REFERENCE TO RELATED APPLICATION

This Application is a non-provisional Application of Indian Application No. 1113/MUM/2014, filed Mar. 28, 2014, in English, the contents of which are hereby incorporated by reference in their entirety.

TECHNICAL FIELD

The current invention relates to offloading of cellular network traffic to Wi-Fi network.

DEFINITIONS OF TERMS USED IN THE SPECIFICATION

The expression 'subscriber' used hereinafter in this specification refers to a person who is using cellular services.

The expression 'near-static parameters' used hereinafter in the specification refers to the parameters related to subscriber that change only when subscriber changes his/her cellular plan, such as prepaid/post-paid, premium/non-premium, etc.

The expression 'dynamic parameters' used hereinafter in the specification refers to the parameters related to subscribers that change with time such as nature of traffic (real-time/non-real-time).

The expression 'predefined cellular network threshold value' used hereinafter in the specification refers to the operator configured maximum accepted utilization of total traffic in cellular network.

The expression 'predefined Wi-Fi network buffer value' used hereinafter in the specification refers to the minimum capacity that should be always available in the Wi-Fi network.

The expression 'predetermined trigger rules' used hereinafter in the specification refers to the external interrupts which would trigger the need for highest priority offload.

The expression 'total cellular network utilization value' used hereinafter in the specification refers to value corresponding to traffic load utilized in the cellular network.

The expression 'Wi-Fi network available capacity' used hereinafter in the specification refers to the remaining capacity in the Wi-Fi network.

The expression 'cellular network threshold value' indicates operator configured maximum accepted utilization of the total traffic in the cellular network.

The expression 'type-A' subscribers are the potential subscribers for offload as a result of cellular network utilization going beyond threshold value.

The expression 'type-B' subscribers are the potential subscribers for offload as a result of external interrupts resulting into trigger.

The expression 'type-C' subscribers are the actual subscribers for offload as a result of adaptive dichotomic methodology

BACKGROUND

In today's world, both mobile subscribers and the network operators are concerned with aspects like amount of data traffic that they could transmit/receive over the network, the perceived quality of experience, security of data transfer, low cost per bit of data transfer, seamless roaming and carrier-grade mobility. Further, due to limited spectrum resources and combined with the humongous explosion in the data traffic, the capacity offered by the cellular network operator has not been able to keep pace. Notably, there is a big gap in the industry to find alternate yet feasible means to provide the high data-rates asked by the subscribers and maintain quality of service to the data-hungry subscribers, while also ensuring that the network resources are not completely saturated.

All high-end phones today not only support cellular technologies but also support other technologies, especially Bluetooth and Wi-Fi. Further, the devices could also be configured to use small-cell technologies like Femto-cells, Pico-cells, etc. operating in the same spectrum as cellular network and Wi-Fi operating in license-free band (e.g. 2.4 GHz, 5.8 GHz) and hence, requires no licensing. Of these Wi-Fi has two unique advantages. Firstly, Wi-Fi supports data transmission of the order of several hundreds of Mbps which is at times even better than offered by cellular networks. Secondly, it is commonly available in households and public places and subscribers are more than willing to adapt to Wi-Fi for data transfer. Hence, mobile network operators are strategically positioned to integrate Wi-Fi with macro-cellular networks.

Currently, the Wi-Fi service provided in the neighborhood of cellular coverage area is independent of the cellular network operator. Hence, the current method of cellular to Wi-Fi offloading is the subscriber-centric method wherein the switching from cellular to Wi-Fi is being done manually and has been driven by subscribers themselves. However, the main problem of subscriber-driven Wi-Fi offloading solution is the inability of the network operator to have a complete visibility of the traffic over the network. Further, a subscriber driven offloading mechanism would be unable to select an optimum offloading strategy as it has no information on utilization and capability of the cellular and Wi-Fi network.

Therefore, there exists a need in the art for network initiated offloading mechanism wherein, the subscriber would be offloaded from cellular to Wi-Fi network in an optimal manner in real time.

OBJECTS

Some of the objects of the present disclosure aim to ameliorate one or more problems of the prior art or to at least provide a useful alternative are listed herein below.

An object of the present disclosure is to have a network-centric fully automated offloading decision with no manual intervention.

Another object of the present disclosure is to provide a prioritized approach in the decision making process for offloading the cellular traffic.

Yet another object of the present disclosure is to enable service continuity to the subscribers even when they are offloaded from cellular to Wi-Fi network.

Still another object of the present disclosure is to bring in the real-time aspect in order to improve the overall network performance.

Other objects and advantages of the present claimed subject matter will be more apparent from the following description when read in conjunction with the accompanying figures, which are not intended to limit the scope of the present disclosure.

SUMMARY

The present disclosure envisages a computer implemented system and method for offloading traffic belonging to a plurality of subscribers, from cellular network to Wi-Fi network.

The system comprises a system processor to provide system processing commands, a repository to store predetermined rules, a cellular network utilization extractor to extract cellular network utilization value, a Wi-Fi network capacity determiner to determine Wi-Fi network available capacity, an offload decision making module to make decision relating to subscriber selection request, a trigger module to check the occurrence of pre-determined rules, a subscriber selection module to automatically select the set of subscribers using adaptive dichotomic methodology and an offloading module to offload selected subscriber's traffic from cellular to the Wi-Fi network.

BRIEF DESCRIPTION OF ACCOMPANYING DRAWINGS

DETAILED DESCRIPTION OF THE ACCOMPANYING DRAWINGS

A computer implemented system and method for offloading traffic belonging to plurality of subscribers, from cellular to Wi-Fi network will now be described with reference to the embodiment shown in the accompanying drawings. The embodiment does not limit the scope and ambit of the disclosure. The description relates purely to the examples and preferred embodiments of the disclosed system and its suggested applications.

The system herein and the various features and advantages thereof are explained with reference to the non-limiting embodiments in the following description. Descriptions of well-known parameters and processing techniques are omitted so as to not unnecessarily obscure the embodiment herein. The examples used herein are intended merely to facilitate an understanding of ways in which the embodiment herein may be practiced and to further enable those of skill in the art to practice the embodiment herein. Accordingly, the examples should not be construed as limiting the scope of the embodiment herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 1:
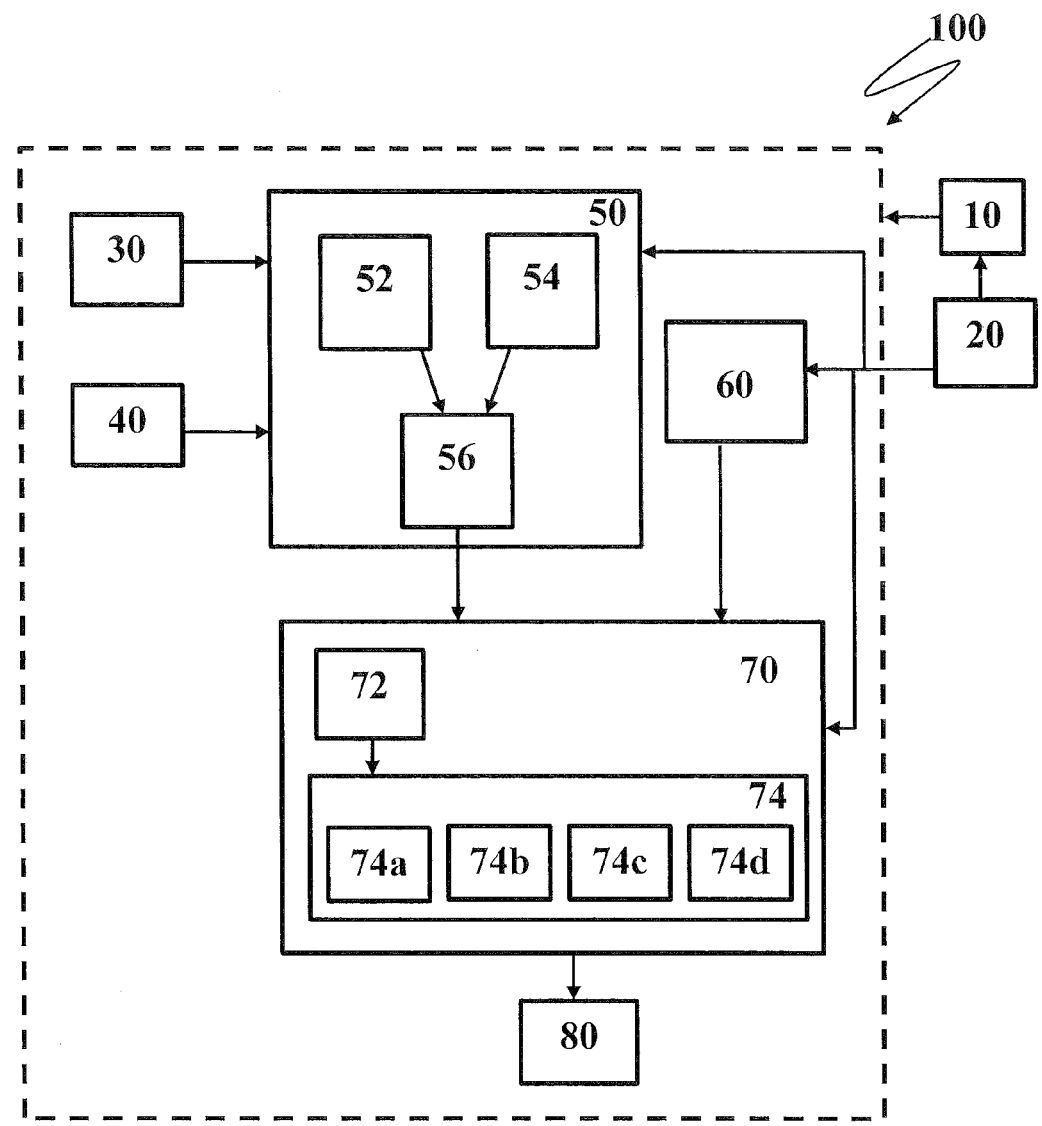
FIG. 1 illustrates a schematic block diagram for offloading traffic belonging to plurality of subscribers, from cellular to Wi-Fi network, in accordance with present disclosure.

Referring to FIG. 1, illustrates a system 100 for offloading traffic belonging to plurality of subscribers, from cellular to Wi-Fi network. The system 100 comprises: a system processor 10, a repository 20, a cellular network utilization determiner 30, a Wi-Fi network capacity determiner 40, an offload decision making module 50, a trigger module 60, a subscriber selection module 70 and an offloading module 80.

The system processor 10 is configured to receive rules and possessing functional elements to provide system processing commands. The system processor 10 may be implemented as one or more microprocessors, microcomputers, microcontrollers, digital signal processors, central processing units, state machines, logic circuitries, and/or any devices that manipulate signals based on operational instructions. Among other capabilities, the system processor 10 configured to fetch and execute computer-readable predetermined set of rules stored in the repository 20.

The repository 20 configured to store including but not limited to a predetermined set of rules, a predefined cellular network threshold value, a predefined Wi-Fi network buffer value, predetermined trigger rules, near-static parameters with respect to plurality of subscribers.

The repository 20 can include any computer-readable medium known in the art including, for example, volatile memory (e.g., RAM), and/or non-volatile memory (e.g., EPROM, flash memory, etc.)

The cellular network utilization determiner 30 determines a total cellular network utilization value from the cellular network.

The Wi-Fi network available capacity determiner 40 determines a remaining Wi-Fi network capacity.

The offload decision making module 50 configured to cooperate with the system processor 10, repository 20 to receive the predefined cellular network threshold value and predefined Wi-Fi network buffer value. The offload decision making module 50 also cooperates with the cellular network utilization determiner 30 to receive the total cellular network utilization value and Wi-Fi network capacity determiner 40 to receive the Wi-Fi network available capacity.

The offload decision making module 50 comprises: a cellular comparator 52, a Wi-Fi comparator 54 and a request generator 56.

The cellular comparator 52 is configured to compare the total cellular network utilization value with the predefined cellular network threshold value.

The Wi-Fi comparator 54 is configured to compare the Wi-Fi network available capacity obtained from 40 with predefined Wi-Fi network buffer value and is further configured to determine a Wi-Fi network residual capacity wherein the Wi-Fi network residual capacity is computed by subtracting the predefined Wi-Fi network buffer value from the Wi-Fi network available capacity.

The request generator 56 configured to cooperate with the cellular comparator 52 and the Wi-Fi comparator 54 and further configured to generate a subscriber selection request for a type-A subscribers if said total cellular network utilization value is greater than the predefined cellular network threshold value and the Wi-Fi network residual capacity is greater than zero.

The trigger module 60 is configured to cooperate with the system processor 10, the repository 20 to receive the predetermined trigger rules. The trigger module is further configured to analyze external interrupts and select a type-B subscribers from the plurality of subscribers based on analyzed external interrupts and predetermined trigger rules. In an embodiment, predetermined trigger rules comprises rules relating to:

I. Cell-edge subscribers: The subscribers in the edge of cellular network might or might not receive sufficient signal strength from the base station/eNodeB. In situations when the subscribers at the cell-edge does not receive the requisite data-rate for a considerable period of time, they are considered for offload where they would be served by Wi-Fi network if there is capacity available in the Wi-Fi network.

II. Link Utilization: This scenario occurs when certain links in the cellular network are overly utilized, even when the overall network utilization is still below the threshold. In this scenario, typically an alarm is sent to the operator's network to check whether the cellular resources can be improved; so as to enhance the link's capacity. If the link utilization of one or more link is still above the threshold value, an external trigger is sent that indicates an offload to Wi-Fi.

III. Custom-set triggers: There could be other custom-set triggers wherein a trigger could be sent to the offloading mechanism in the server whenever there is any specific incident that demands subscriber traffic offload, such as but not limited to:
  Cellular subscribers running many applications/having high usage in his/her device
  Cellular subscribers experiencing bad quality of service (QoS) over a certain period of time or expresses desire to move onto Wi-Fi network
  Subscribers sending offload request based on commercial grounds such as usage, plan, cost, etc.

In an embodiment, the trigger module 60 gets external interrupts from the cellular network and the former is configured to identify the occurrence of trigger, based on the predetermined trigger rules like cellular edge subscribers, link utilization, subscribers running many applications/having high usage in his/her device, subscribers experiencing bad quality of service (QoS) over a certain period of time etc.

The subscriber selection module 70 cooperates with the system processor 10, the repository 20 to receive the near-static parameters, the request generator 56 to receive the subscriber selection request for the type-A subscribers and trigger module 60 to receive the type-B subscribers.

In an embodiment, the subscriber selection module 70 is configured to compare the total traffic of type-B subscribers with the Wi-Fi network residual capacity. Further subscriber selection module is configured to send the total traffic of type-B subscribers (subscribers selected by trigger module) to the offloading module 80 if the total traffic of type-B subscribers is less than or equal to the Wi-Fi network residual capacity.

The subscriber selection module comprises: a parameter identifier 72 and a subscriber identifier 74.

The parameter identifier 72 is configured to identify the near-static parameters and dynamic parameters of the type-A subscribers and further configured to identify the near-static and dynamic parameters for the type-B subscribers in case the overall traffic of the type-B subscribers is greater than the Wi-Fi network residual capacity.

The near-static parameters are the parameters related to subscriber that changes only when subscriber changes his/her plan. According to an embodiment, near-static parameters include:
i. Subscriber Status: Premium or Non-Premium subscriber;
ii. Subscriber Location: Local or Roaming subscriber;
iii. Subscriber Plan: Pre-paid or Post-paid;

The dynamic parameters are the parameters related to subscribers that change with time such as nature of traffic (real-time/non-real-time). In one of the embodiment dynamic parameter comprises:
  I. Data requirement: Real-time traffic/non-real time traffic which a subscriber application is presently consuming/utilizing.
  II. Data type: Low data-rate/high data-rate traffic which a subscriber application is presently consuming/utilizing.
  III. Data Security Requirement: High/Low data security requirement based on subscriber application is presently utilizing.

In an embodiment the parameters identified by parameter identifier 72 are either for the type-A subscribers or the type-B subscribers selected by the trigger module 60.

The subscriber identifier 74 is configured to cooperate with the parameter identifier 72 and further configured to select type-C subscribers based on the near-static and the dynamic parameters using adaptive dichotomy representation.

The subscriber identifier 74 comprises: a computational unit 74a, a comparator 74b, a classifier 74c and a selector 74d.

The computational unit 74a is configured to compute the total traffic of the selected set of subscribers and the Wi-Fi network residual capacity;

The comparator 74b is configured to compare the total traffic of the selected set of subscribers and the Wi-Fi network residual capacity;

The classifier 74c is configured to classify the set of subscribers into at least two sets of subscribers with different priorities, if the Wi-Fi network residual capacity is greater than zero; and The selector 74d is configured to select at least one subscriber using adaptive dichotomic methodology.

Figure 4:
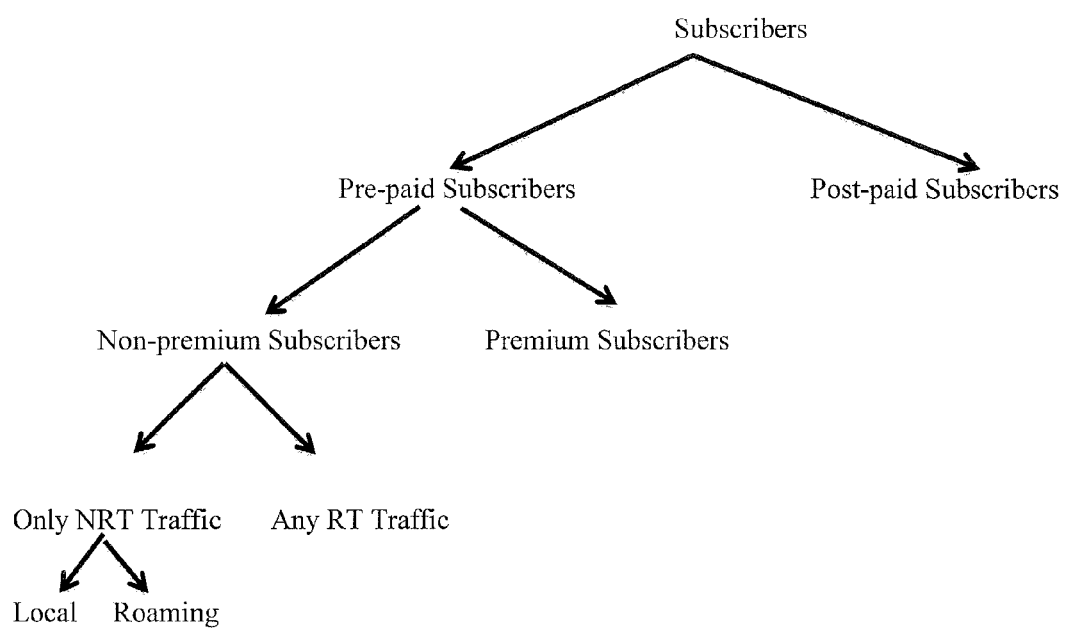
FIG. 4 illustrates the graphical representation of another exemplary embodiment, in accordance with present disclosure.

FIG. 4 illustrates an exemplary embodiment wherein subscriber identifier 74 selects using the adaptive dichotomic representation.

The adaptive dichotomic representation according to subscriber identifier 74 which is applied to selection of subscribers for offload from cellular to Wi-Fi network is the hallmark of the proposed invention. The adaptive dichotomic method has a upper bound complexity of the order of log(N) wherein N is the total number of near-static and dynamic parameters considered for offloading. In an embodiment, subscriber selection module provides higher priority to the type-B subscribers (selected by trigger module) for offloading.

The offloading module 80 is configured to cooperate with the subscriber identifier 74 to receive the type-C subscribers and further configured to offload traffic corresponding to the type-C subscribers to the Wi-Fi network. In an embodiment, traffic offloading by the offloading module 80 continues till either all selected subscribers are offloaded or there is no more capacity available in the Wi-Fi network. In another embodiment, a checkpoint is included in module 80 to check for subscriber willingness for offload which is captured as a subscriber specific parameter by the operator. This checkpoint allows only willing subscribers to be offloaded to the Wi-Fi network.

Figure 2A:
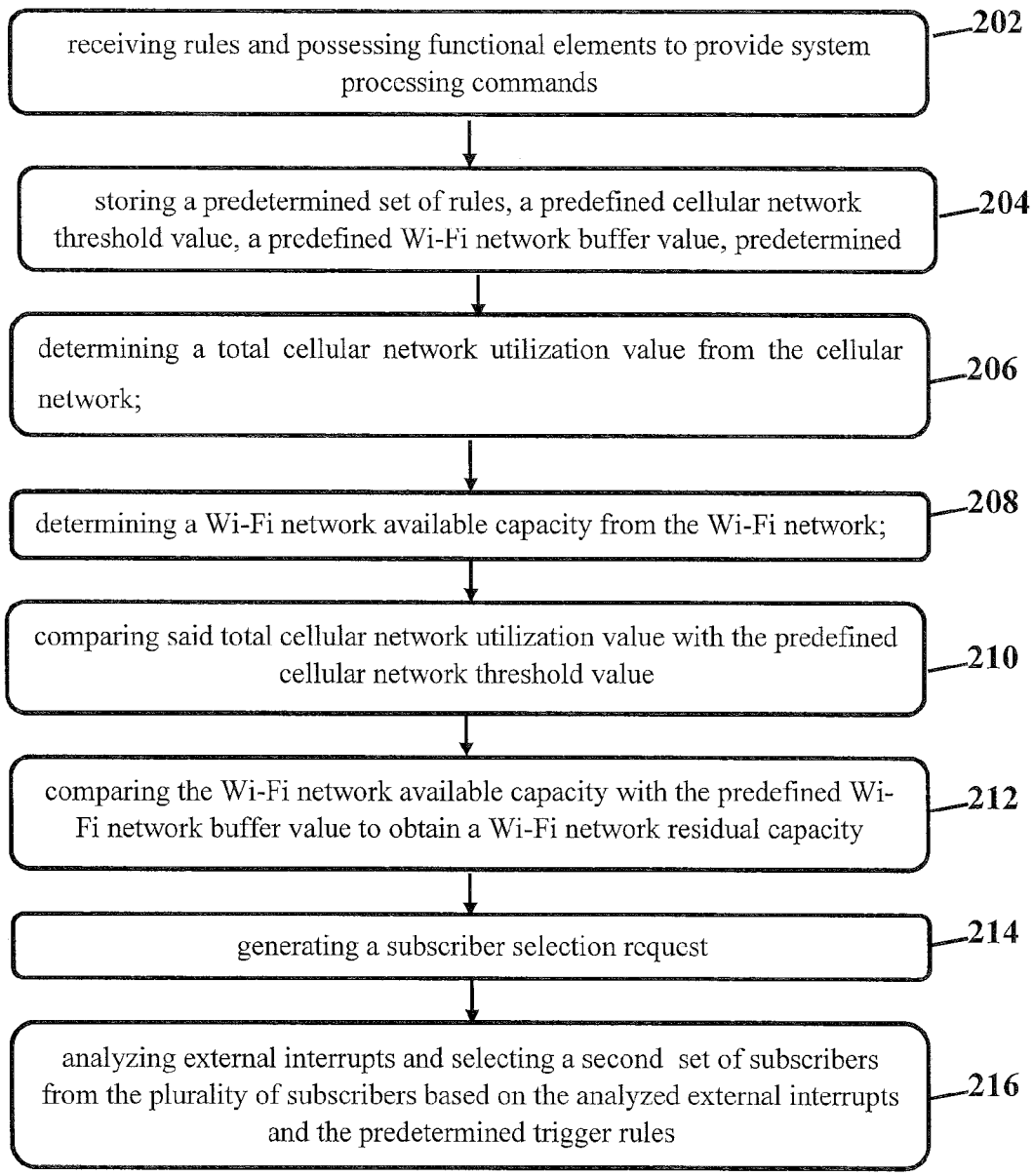
FIGS. 2A and 2B illustrates a flow diagram showing the steps involved in offloading traffic, from cellular to Wi-Fi network, in accordance with present disclosure.
Figure 2B:
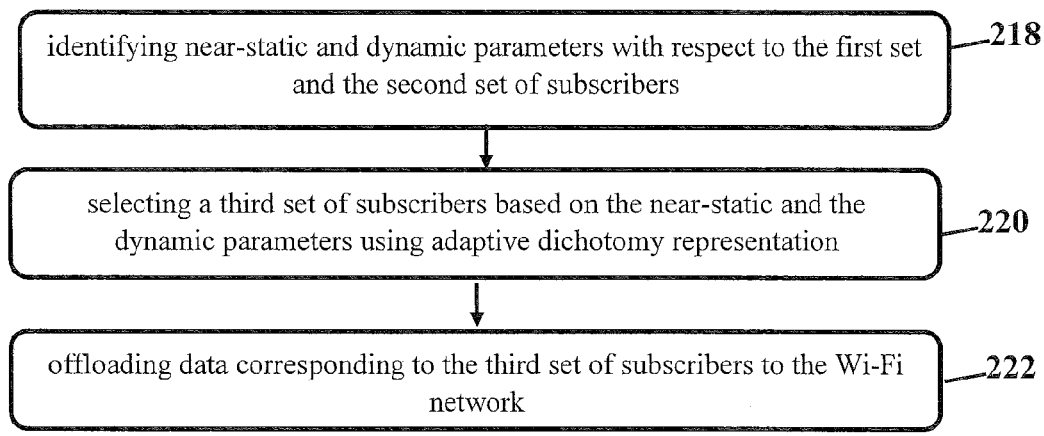

FIGS. 2A and 2B illustrates a flow diagram showing the methodology involved in network-centric real-time traffic offloading, from cellular to Wi-Fi network.

In step 202, the rules and possessing functional elements is received by the processor 10 (shown in FIG. 1) and system processing commands are provided.

In step 204, the repository 20 (shown in FIG. 1) stores a predetermined set of rules, a predefined cellular network threshold value, a predefined Wi-Fi network buffer value, predetermined trigger rules, a near-static parameters with respect to plurality of subscribers.

In step 206, a total cellular network utilization value is determined from the cellular network.

In step 208, a Wi-Fi network available capacity is determined from the Wi-Fi network.

In step 210, the total cellular network utilization value is compared with the predefined cellular network threshold value.

In step 212, the Wi-Fi network available capacity is compared with the predefined Wi-Fi network buffer value to obtain a Wi-Fi network residual capacity. In an embodiment Wi-Fi network residual capacity is computed by subtracting the predefined Wi-Fi network buffer value from the Wi-Fi network available capacity.

In step 214, a subscriber selection request is generated for the type-A subscribers if the total cellular network utilization value is greater than the predefined cellular network threshold value and the Wi-Fi network available capacity is greater than the predefined Wi-Fi network buffer value.

In step 216, external interrupts are analyzed, and type-B subscribers are selected from plurality of subscribers based on the analyzed external interrupts and the predetermined trigger rules.

In an embodiment the total traffic of the type-B subscribers is compared with the Wi-Fi network residual capacity and either of the below two actions are initiated:
  a. the type-B subscribers selected are directly sent for offloading, if the total traffic of the type-B subscribers is less than or equal to the Wi-Fi network residual capacity, or
  b. the type-B subscribers are sent to the step 218 for further classification, if the total traffic of the type-B subscribers is greater than the Wi-Fi network residual capacity.

In step 218, the near-static and dynamic parameters are identified for the type-A and type-B subscribers.

In step 220, a type-C subscribers are selected, based on near-static and dynamic parameters using adaptive dichotomic representation.

In an embodiment, the step of selecting the type-C subscriber(s) comprising:
  I. computing the total traffic for the selected set of subscribers and the Wi-Fi network residual capacity;
  II. comparing the total traffic of the selected set of subscribers and the Wi-Fi network residual capacity;
  III. classifying the set of subscribers into at least two sets of subscribers with different priorities, only when the Wi-Fi network residual capacity is greater than zero; and
  IV. selecting at least one subscriber for offload from classified sets using adaptive dichotomic methodology.

In step 222, traffic corresponding to the type-C subscribers is offloaded to the Wi-Fi network. In an embodiment this step continues till either all selected subscribers are offloaded to the Wi-Fi network or there is no more capacity available for offloading in the Wi-Fi network.

Figure 3:
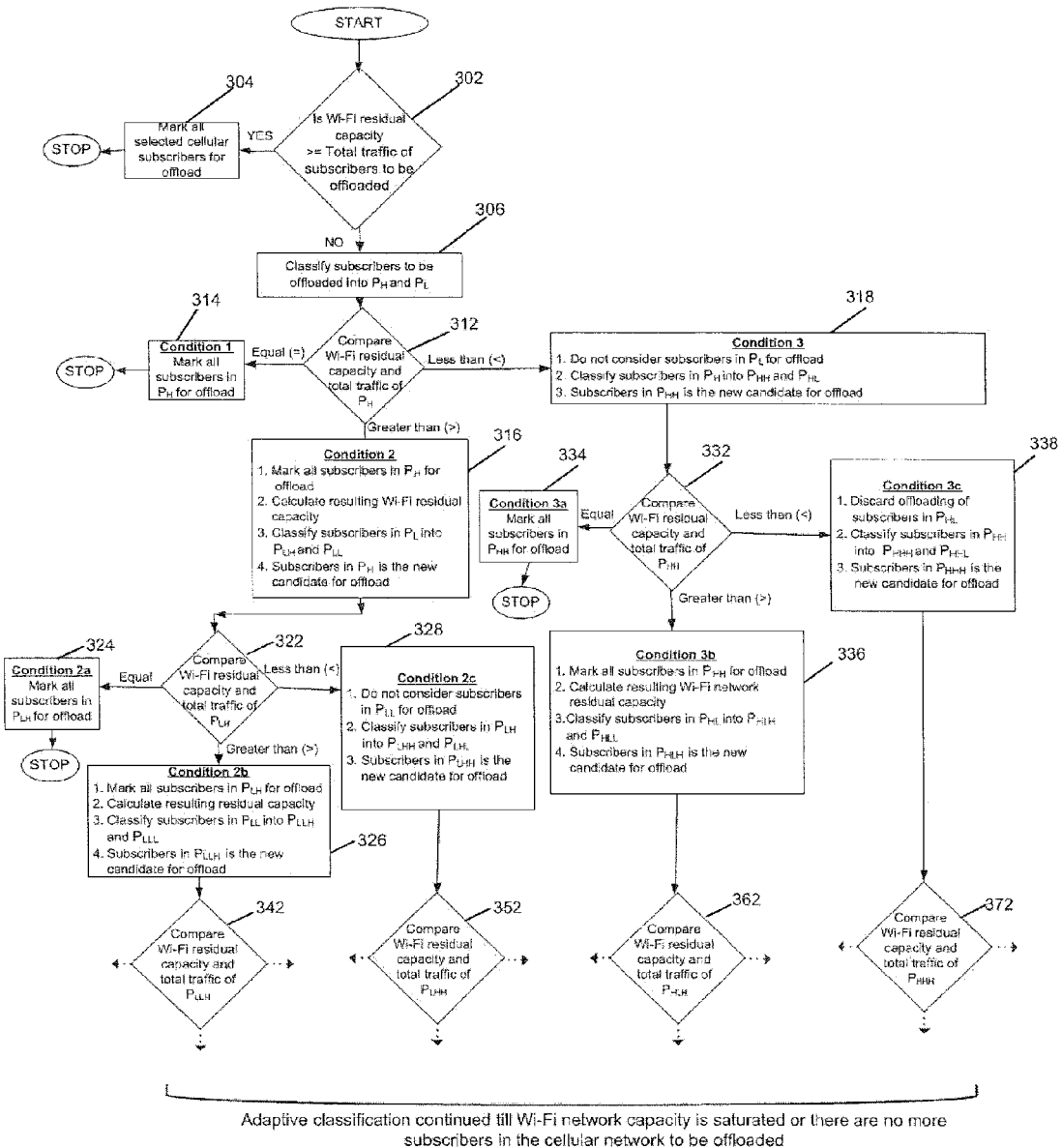
FIG. 3 illustrates an exemplary embodiment for representation of adaptive dichotomic methodology for selection of subscribers based on near-static and dynamic parameters, in accordance with present disclosure.

FIG. 3 illustrates an exemplary embodiment for representation of adaptive dichotomic methodology for selection of subscribers based on near-static and dynamic parameters.

Specifically, FIG. 3 illustrates the functionality of subscriber identifier 74 of FIG. 1 and step 220 of FIG. 2 in granular detail.

The block 302 is configured to compare the total traffic of the subscribers to be offloaded with the Wi-Fi network residual capacity. If the Wi-Fi network residual capacity is greater than or equal to the total traffic of the subscribers to be offloaded, then the block 304 marks all the selected cellular subscribers for offload.

If the Wi-Fi network residual capacity is less than the total traffic of the subscribers to be offloaded, then the block 306 classifies the selected subscribers into two sets $P_H$ and $P_L$ based on a parameter selected from near-static and dynamic parameter list. $P_H$ denotes the set of subscribers that deserve highest offloading treatment whereas $P_L$ denotes the set of subscribers that deserve low offloading treatment.

The block 312 is configured to compare the Wi-Fi network residual capacity with the total traffic of the subscribers in $P_H$. There are three possible conditions arising from the same as observed in blocks 314, 316 and 318 which are described below.

On occurrence of condition 1, i.e, when the Wi-Fi network residual capacity is equal to the total traffic of subscribers in $P_H$, the block 314 marks all the subscribers for offload and the process is stopped.

On occurrence of condition 2, i.e, when the Wi-Fi network residual capacity is greater than the total traffic of subscribers in $P_H$, the block 316 then
  1. marks all subscribers in $P_H$ for offload;
  2. calculates the resulting Wi-Fi network residual capacity;
  3. classifies the subscribers in set $P_L$ into $P_{LH}$ and $P_{LL}$; and
  4. computes the total traffic of $P_{LH}$.

The block 322 is configured to compare the Wi-Fi network residual capacity with the total traffic of subscribers in $P_{LH}$. This gives rise to same three possible conditions as were there in block 312 and are represented by the blocks 324, 326 and 328 which are described below.

On occurrence of condition 2a, i.e, when the Wi-Fi network residual capacity is equal to the total traffic of subscribers in $P_{LH}$, the block 324 marks all the subscribers for offload and the process is stopped.
  On occurrence of condition 2b, i.e, when the Wi-Fi network residual capacity is greater than the total traffic of subscribers in $P_{LH}$, the block 326 then,
    1. marks all subscribers in $P_{LH}$ for offload;
    2. calculates the resulting Wi-Fi network residual capacity;
    3. classifies the subscribers in set $P_{LL}$ into $P_{LLH}$ and $P_{LLL}$; and
    4. computes the total traffic of $P_{LLH}$
    the block 342 is configured to compare the Wi-Fi network residual capacity with the total traffic of subscribers in $P_{LLH}$. At this stage, if the Wi-Fi network residual capacity is still available, then the steps described in blocks 324, 326 and 328 are repeated till there is no more Wi-Fi network residual capacity.
  On occurrence of condition 2c, i.e., when the resulting Wi-Fi network residual capacity is less than total traffic of subscribers in $P_{LH}$, the block 328 then,
    1. discards the subscribers in $P_{LL}$ from being considered for offload;

2. classifies the subscribers in $P_{LH}$ into $P_{LHH}$ and $P_{LHL}$; and
3. Computes the total traffic of $P_{LHH}$
   the block 352 is configured to compare the Wi-Fi network residual capacity with the total traffic of subscribers in $P_{LHH}$. At this stage, if the Wi-Fi network residual capacity is still available, then the steps described in blocks 324, 326 and 328 are repeated till there is no more Wi-Fi network residual capacity On occurrence of condition 3, i.e., if the Wi-Fi network residual capacity is less than the total traffic of subscribers in $P_H$, the block 318 then,
1. discards the subscribers in $F_L$ from being considered for offload;
2. classifies the subscribers in $P_H$ into $P_{HH}$ and $P_{HL}$; and
3. computes the total traffic of $P_{HH}$ The block 332 is configured to compare the Wi-Fi network residual capacity with the total traffic of subscribers in $P_{HH}$. This gives rise to same three possible conditions as were there in block 312 and are represented by the blocks 334, 336 and 338 which are described below.

On occurrence of condition 3a, i.e, when the total traffic of subscribers in $P_{HH}$ is equal to the remaining Wi-Fi network residual capacity, the block 334 marks all subscribers in $P_{HH}$ for offload and the process is stopped.

On occurrence of condition 3b, i.e, when the resulting Wi-Fi network residual capacity is greater than of the total traffic of $P_{HH}$, the block 336 then
1. marks all subscribers in $P_{HH}$ for offload;
2. calculates the resulting Wi-Fi network capacity;
3. classifies the subscribers in $P_{HL}$ into $P_{HLH}$ and $P_{HLL}$; and
4. computes the total traffic of $P_{HLH}$.

The block 362 is configured to compare the Wi-Fi network residual capacity with the total traffic of subscribers in $P_{HLH}$. At this stage, if the Wi-Fi network residual capacity is still available, then the steps described in blocks 334, 336 and 338 are repeated till there is no more Wi-Fi network residual capacity.

On occurrence of condition 3c, i.e, when the resulting Wi-Fi network residual capacity is less than that of the total traffic of $P_{HH}$, the block 338 then,
1. discards the subscribers in $P_{HL}$ from being considered for offload;
2. classifies the subscribers in $P_{HH}$ into $P_{HHH}$ and $P_{HHL}$;
3. computes the total traffic of $P_{HHH}$.

The block 372 is configured to compare the Wi-Fi network residual capacity with the total traffic of subscribers in $P_{HHH}$. At this stage, if the Wi-Fi network residual capacity is still available, then the steps described in blocks 334, 336 and 338 are repeated till there is no more Wi-Fi network residual capacity.

In an embodiment, if all the subscribers have the same priority, then the algorithm randomly classifies the subscribers into two sets by dividing the number of subscribers into halves, wherein these two sets will have different priorities for offloading.

In another embodiment adaptive classification continues till Wi-Fi network capacity is saturated or there are no more subscribers in the cellular network to be offloaded.

In an exemplary embodiment, wherein there are 100 offload subscribers in the cellular network and each subscriber has a constant ongoing traffic of 2 MB. Assume that pre-defined cellular network threshold value is 120 MB. However, the Wi-Fi network has available capacity of only 60 MB. Further, the Wi-Fi network policy states that the traffic offload into its network should leave a small value of 10 MB capacity as the buffer value for the Wi-Fi network. That would imply,
1. Number of subscribers=100
2. Total traffic of cellular subscribers=100×2 MB=200 MB
3. Cellular network threshold value=120 MB
4. Hence, cellular traffic to be offloaded=200−120=80 MB
5. Wi-Fi network available capacity=60 MB
6. Wi-Fi network residual capacity=60−10=50 MB Now, since Wi-Fi network residual capacity<traffic to be offloaded, (i.e., 50<80), the entire set of cellular subscribers cannot be offloaded to Wi-Fi network.

Assuming that the first level of classification of subscribers is based on a subscriber static parameter—pre-paid/post-paid subscriber; and given that there are 60% pre-paid subscribers which are given higher priority for offloading, this would imply:
  $P_H$=60 and total traffic of subscribers in $P_H$=60×2 MB=120 MB while
  $P_L$=40 and total traffic of subscribers in $P_H$=40×2 MB=80 MB Further, since Wi-Fi network residual capacity<total traffic of subscribers in $P_H$, (i.e, 50<120), only a sub-set of $P_H$ would be offloaded. Further, the subscribers in $P_L$ (i.e., the 40 subscribers within $P_L$) would not be considered anymore for offload. The 60 subscribers within $P_H$ would now be further classified based on a parameter; say premium/non-premium subscriber. Assuming that out of 60 subscribers in $P_H$, 20 are premium and 40 are non-premium subscribers with higher priority for offloading being assigned to non-premium subscribers, this would imply:
  $P_{HH}$=40 with total traffic of subscribers in $P_{HH}$=40×2 MB=80 MB and
  $P_{HL}$=20 with total traffic of subscribers in $P_{HL}$=20×2 MB=40 MB.

As observed above, since Wi-Fi network residual capacity<total traffic of subscribers in $P_{HH}$, (i.e, 50<80), all the subscribers within $P_{HH}$ cannot be offloaded to Wi-Fi network. Hence, the next step would be to classify the 40 $P_{HH}$ subscribers into two further categories; say based on those subscribers carrying real-time or non-real-time traffic. Assuming that there are 15 subscribers carrying real-time traffic and remaining 25 subscribers carrying non-real-time traffic (applications like file download, etc. which does not come under real-time considerations) and hence considered with higher priority for offload; this would imply:
  $P_{HHH}$=25 with total traffic of subscribers in $P_{HHH}$=25×2 MB=50 MB while
  $P_{HHL}$=15 with total traffic of subscribers in $P_{HHL}$=15×2 MB=30 MB In this case, the traffic of $P_{HHH}$ subscribers (50 MB) would be offloaded to the Wi-Fi network. Further, since 50 MB is the same as the Wi-Fi network residual capacity, the algorithm would stop at this point for the above example.

The above example is represented graphically in FIG. 4 of the accompanying drawings wherein subscribers are selected using adaptive dichotomic representation based on their priority.

Complexity of Proposed Adaptive Classification Technique

Importantly, the above explained adaptive dichotomic classification is a customization of well-known dichotomic classification; with following major changes:
  i. The adaptation is carried out based on the traffic in the number of subscribers considered for offload and the number of parameters available for classification.

ii. The classification is done only when required and only over selected subscribers.

It is well-known that a dichotomic classification method for N parameters has a complexity of log(N). In the proposed invention, the number of parameters N used for classification is given by the summation of number of near-static (k) and dynamic parameters (p), i.e., N=k+p. All the subscribers in the cellular network would be categorized into one of $2^k \times 2^p$ categories. Further, in the adaptive dichotomic method, all the subscribers are not classified (before offloading). Only a small group of subscribers are classified as and when required. Given that the dichotomic classification has a complexity of the order of log(N), the proposed classification using adaptive dichotomic methodology has an upper bound computational complexity of the order of log(N). Further, as mentioned in condition 1 as described in FIG. 3, if the Wi-Fi network residual capacity is equal to the cellular traffic that needs to be offloaded, the entire offloading mechanism can be carried out in single step, without performing any subscriber classification.

TECHNICAL ADVANCEMENTS

The technical advancements of the system envisaged by the present disclosure include the realization of:
  a network-centric system that fully automates the offloading decision with no manual intervention.
  a system that adaptively classify the subscribers using a prioritized approach in the decision making process for offloading the cellular traffic
  a system that enable service continuity to the subscribers even when they are offloaded from cellular to Wi-Fi network; and
  a system that brings in the real-time aspect in order to improve the overall network performance that includes but not limited to quality of service, uptime, network utilization, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented network centric system for real-time traffic offloading belonging to a plurality of subscribers from a cellular network to a Wi-Fi network, said system comprising:
  a repository configured to store a predetermined set of rules, a predefined cellular network threshold value, a predefined Wi-Fi network buffer value, predetermined trigger rules, near-static parameters with respect to the plurality of subscribers; and
  one or more processors configured by computer-readable instructions to:
    receive the predefined cellular network threshold value and the predefined Wi-Fi network buffer value;
    compare a cellular network utilization value with the predefined cellular network threshold value;
    receive a Wi-Fi network available capacity;
    compare the Wi-Fi network available capacity with the predefined Wi-Fi network buffer value and compute a Wi-Fi network residual capacity by subtracting the predefined Wi-Fi network buffer value from the Wi-Fi network available capacity;
    compare whether the Wi-Fi network residual capacity is greater than zero;
    generate a subscriber selection request;
    receive the predetermined trigger rules and analyze the external interrupts and select type-B subscribers from the plurality of subscribers based on the analyzed external interrupts and the predetermined trigger rules;
    receive the near-static parameters;
    receive the subscriber selection request for type-A subscribers and receive the type-B subscribers;
    identify near-static and dynamic parameters of the type-A subscribers and the type-B subscribers;
    select type-C subscribers based on the near-static and the dynamic parameters using adaptive dichotomy representation; and
    receive the type-C subscribers and offload traffic corresponding to the type-C subscribers to the Wi-Fi network.

2. The system as claimed in claim 1, wherein the one or more processors are further configured to generate the subscriber selection request responsive to a total cellular network utilization value being greater than the predefined cellular network threshold value and the Wi-Fi network residual capacity being greater than zero.

3. The system as claimed in claim 1 wherein the one or more processors are further configured to compare total traffic of the type-B subscribers with the Wi-Fi network residual capacity and offload traffic corresponding to the type-B subscribers responsive to the total traffic of the type-B subscribers being less than or equal to the Wi-Fi network residual capacity.

4. The system as claimed in claim 1 wherein the one or more processors are further configured to compare total traffic of the type-B subscribers with the Wi-Fi network residual capacity and classify the type-B subscribers according to adaptive dichotomic representation responsive to the total traffic of the type-B subscribers being greater than the Wi-Fi network residual capacity.

5. The system as claimed in claim 1, wherein the one or more processors are further configured to provide a highest priority to the type-B subscribers for offloading.

6. A computer implemented network centric method for real-time traffic offloading belonging to a plurality of subscribers from a cellular network to a Wi-Fi network, said method comprising:
  storing a predetermined set of rules, a predefined cellular network threshold value, a predefined Wi-Fi network buffer value, predetermined trigger rules, near-static parameters with respect to the plurality of subscribers;
  receiving the predefined cellular network threshold value and the predefined Wi-Fi network buffer value;
  comparing a cellular network utilization value with the predefined cellular network threshold value;
  comparing a Wi-Fi network available capacity with the predefined Wi-Fi network buffer value;
  computing a Wi-Fi network residual capacity;
  generating a subscriber selection request for type-A subscribers if said total cellular network utilization value is greater than the predefined cellular network threshold value and the Wi-Fi network residual capacity is greater than zero;

analyzing external interrupts and selecting type-B subscribers from the plurality of subscribers based on the analyzed external interrupts and the predetermined trigger rules;

sending a list of type-B subscribers either for offloading or for identifying near-static and dynamic parameters;

identifying the near-static and dynamic parameters of the type-A subscribers and the type-B subscribers;

selecting type-C subscribers based on the near-static and the dynamic parameters using adaptive dichotomy representation, wherein selecting the type-C subscribers comprises:

computing total traffic of the selected type-C subscribers and the Wi-Fi network residual capacity;

comparing the total traffic of the selected type-C subscribers and the Wi-Fi network residual capacity;

classifying the selected type-C subscribers into at least two sets of subscribers with different priorities, only when the Wi-Fi network residual capacity is greater than zero; and selecting at least one subscriber for offload from the at least two classified sets using adaptive dichotomic methodology; and offloading traffic corresponding to the type-C subscribers to the Wi-Fi network.

7. The method as claimed in claim 6, further comprising:
comparing total traffic of the type-B subscribers with the Wi-Fi network residual capacity;
offloading traffic corresponding to the type-B subscribers responsive to the total traffic of the type-B subscribers being less than or equal to the Wi-Fi network residual capacity; and
classifying the type-B subscribers according to adaptive dichotomic representation responsive to the total traffic of the type-B subscribers being greater than the Wi-Fi network residual capacity.

8. A computer implemented network centric system for real-time traffic offloading belonging to a plurality of subscribers from a cellular network to a Wi-Fi network, said system comprising:
a repository configured to store a predetermined set of rules, a predefined cellular network threshold value, a predefined Wi-Fi network buffer value, predetermined trigger rules, near-static parameters with respect to the plurality of subscribers; and
one or more processors configured by computer-readable instructions to:
receive the predefined cellular network threshold value and the predefined Wi-Fi network buffer value;
compare a cellular network utilization value with the predefined cellular network threshold value;
compare a Wi-Fi network available capacity with the predefined Wi-Fi network buffer value;
compute a Wi-Fi network residual capacity;
generate a subscriber selection request; receive the predetermined trigger rules;
analyze external interrupts and select type-B subscribers from the plurality of subscribers based on the analyzed external interrupts and the predetermined trigger rules;
receive the near-static parameters;
receive the subscriber selection request for the type-A subscribers and receive the type-B subscribers;
identify near-static and dynamic parameters of the type-A subscribers and the type-B subscribers;
select type-C subscribers based on the near-static and the dynamic parameters using adaptive dichotomy representation;
receive the type-C subscribers;
compute total traffic of the selected type-C subscribers and the Wi-Fi network residual capacity;
compare the total traffic of the selected type-C subscribers with the Wi-Fi network residual capacity;
responsive to the Wi-Fi network residual capacity being greater than zero, classify the selected type-C subscribers into at least two sets of subscribers with different priorities;
select at least one subscriber of the classified sets using adaptive dichotomic methodology; and
offload traffic corresponding to the selected at least one subscriber to the Wi-Fi network.

9. A computer implemented network centric method for real-time traffic offloading belonging to a plurality of subscribers from a cellular network to a Wi-Fi network, said method comprising:
storing a predetermined set of rules, a predefined cellular network threshold value, a predefined Wi-Fi network buffer value, predetermined trigger rules, near-static parameters with respect to the plurality of subscribers;
receiving the predefined cellular network threshold value and the predefined Wi-Fi network buffer value;
comparing a cellular network utilization value with the predefined cellular network threshold value;
computing a Wi-Fi network residual capacity based on a Wi-Fi network available capacity and the predefined Wi-Fi network buffer value;
selecting type-A subscribers if the cellular network utilization value is greater than the predefined cellular network threshold value and the Wi-Fi network residual capacity is greater than zero;
receiving the predetermined trigger rules;
analyzing external interrupts and selecting type-B subscribers from the plurality of subscribers based on the analyzed external interrupts and the predetermined trigger rules;
receiving the near-static parameters;
identifying near-static and dynamic parameters of the selected type-A subscribers and the selected type-B subscribers;
selecting type-C subscribers based on the near-static and the dynamic parameters using adaptive dichotomy representation, comprising steps of:
i. identifying the near-static and dynamic parameters of the subscribers;
ii. classifying the selected type-C subscribers into at least two prioritized sets and labeling any two sets of the at least two sets as a high priority set and a low priority set;
iii. determining resulting Wi-Fi network residual capacity;
iv. selecting for offload, all the subscribers from the high priority set
a. if the Wi-Fi network residual capacity equals a total traffic of all subscribers in the high priority set, then marking for offload, all the subscribers from the high priority set and stopping the steps of using the adaptive dichotomy representation;
b. else if the Wi-Fi network residual capacity is greater than the total traffic of all subscribers in the high priority set, then marking all the subscribers in the high priority set for offload and further sub-classifying the subscribers within the low priority set as high priority and low priority, selecting all the subscribers sub-classified as high priority within the low priority set for offload if a total traffic of the subscribers sub-classified as high priority is less than the Wi-Fi network residual capacity else the subscribers sub-classified as high priority within the low priority set are further selected for offload by repeating the steps ii to iv;

c. else if the Wi-Fi network residual capacity is less than the total traffic of all subscribers sub-classified as high priority, then classifying the subscribers sub-classified as high priority further as high priority and low priority and selecting all subscribers classified as high priority within the high priority set for offload if the total traffic of the selected subscribers is less than the Wi-Fi network residual capacity else, the subscribers within the high priority set are further selected for offload by repeating the steps ii to iv; and reiterating the steps ii-iv until the Wi-Fi network cannot take any more traffic or all the subscribers in the cellular network are offloaded to the Wi-Fi network; and responsive to selection of the type-C subscribers, offloading traffic corresponding to the selected type-C subscribers to the Wi-Fi network.

10. A computer implemented network centric method for real-time traffic offloading belonging to a plurality of subscribers from a cellular network to a Wi-Fi network, said method comprising:

storing a predetermined set of rules, a predefined cellular network threshold value, a predefined Wi-Fi network buffer value, predetermined trigger rules, near-static parameters with respect to the plurality of subscribers;

receiving the predefined cellular network threshold value and the predefined Wi-Fi network buffer value; comparing a cellular network utilization value with the predefined cellular network threshold value;

comparing a Wi-Fi network available capacity with the predefined Wi-Fi network buffer value;

computing a Wi-Fi network residual capacity;

generating a subscriber selection request; receiving the predetermined trigger rules;

analyzing external interrupts and selecting type-B subscribers from the plurality of subscribers based on the analyzed external interrupts and the predetermined trigger rules;

receiving the near-static parameters;

receiving the subscriber selection request for type-A subscribers and receiving the type-B subscribers;

identifying near-static and dynamic parameters of the type-A subscribers and the type-B subscribers;

selecting type-C subscribers based on the near-static and the dynamic parameters using adaptive dichotomy representation;

receiving the type-C subscribers;

computing total traffic of the selected type-C subscribers and the Wi-Fi network residual capacity;

comparing the total traffic of the selected type-C subscribers with the Wi-Fi network residual capacity;

responsive to the Wi-Fi network residual capacity being greater than zero, classifying the selected type-C subscribers into at least two sets of subscribers with different priorities;

selecting at least one subscriber of the classified sets using adaptive dichotomic methodology; and offloading traffic corresponding to the selected at least one subscriber to the Wi-Fi network.

\* \* \* \* \*